United States Patent [19]
Perez

[11] Patent Number: 6,037,758
[45] Date of Patent: Mar. 14, 2000

[54] LOAD CONTROLLER AND METHOD TO ENHANCE EFFECTIVE CAPACITY OF A PHOTOVOLTAIC POWER SUPPLY

[75] Inventor: Richard Perez, Delmar, N.Y.

[73] Assignee: The Research Foundation of State University of New York, Albany, N.Y.

[21] Appl. No.: 09/295,172

[22] Filed: Apr. 20, 1999

Related U.S. Application Data

[60] Provisional application No. 60/083,230, Apr. 27, 1998.

[51] Int. Cl.[7] .............................. G05F 1/40; G05B 24/02; H02J 9/00
[52] U.S. Cl. ......................... 323/268; 323/266; 323/350; 323/906; 307/64; 307/66
[58] Field of Search ..................................... 323/234, 266, 323/268, 318, 350, 906; 307/64, 66

[56] References Cited

U.S. PATENT DOCUMENTS

| | | | |
|---|---|---|---|
| 4,079,591 | 3/1978 | Derby et al. ................................ | 60/641 |
| 4,571,532 | 2/1986 | Jaster .......................................... | 320/2 |
| 4,580,090 | 4/1986 | Bailey et al. ............................. | 323/303 |
| 4,916,382 | 4/1990 | Kent .......................................... | 323/299 |
| 5,293,447 | 3/1994 | Fanney et al. ........................... | 392/449 |
| 5,493,155 | 2/1996 | Okamoto et al. ......................... | 307/45 |
| 5,493,204 | 2/1996 | Caldwell .................................. | 323/299 |
| 5,500,052 | 3/1996 | Horiuchi et al. ......................... | 136/244 |
| 5,501,083 | 3/1996 | Kim ........................................ | 62/228.4 |
| 5,514,223 | 5/1996 | Vogeli ..................................... | 136/244 |
| 5,560,218 | 10/1996 | Jang ....................................... | 62/228.4 |
| 5,576,533 | 11/1996 | Tantraporn .......................... | 250/214 R |
| 5,878,584 | 3/1999 | Sasaki et al. ............................. | 62/115 |
| 5,892,354 | 4/1999 | Nagao et al. ........................... | 323/299 |
| 5,909,061 | 6/1999 | Sasaki et al. ............................. | 307/44 |

OTHER PUBLICATIONS

R. Perez, "Grid–Connected Photovoltaic Power Storage Requirements to Insure 100% Peak Shaving Reliability", ESA Meeting May 1, 1997 Washington, DC, pp. 3–8.

R. Perez et al., "Determination of the End–Use Effective Capacity of Photovoltaics", 14th European PV Conference, pp. 1–3.

R. Perez et al., "Photovoltaics as a Long–Term Solution to Power Outages Case Study: The Great 1996 WSCC Power Outage", Proc. ASES. '97, pp. 1–6.

R. Perez et al., "Geographical Distribution of Photovoltaic Effective Capacity in the United States".

R. Perez et al., Providing Firm Peak Load Reduction With PVs: Operational Results of the NMPC PV.

R. Perez et al., Assessing the Load Matching Capability of Photovoltaics for US Utilities Based Upon.

R. Perez et al., "Photovoltaics Can Add Capacity to the Utility Grid", Brochure produced for U.S.

*Primary Examiner*—Edward H. Tso
*Assistant Examiner*—Bao Q. Vu
*Attorney, Agent, or Firm*—Heslin & Rotherberg, P.C.

[57] ABSTRACT

A load controller and method are provided for maximizing effective capacity of a non-controllable, renewable power supply coupled to a variable electrical load also coupled to a conventional power grid. Effective capacity is enhanced by monitoring power output of the renewable supply and loading, and comparing the loading against the power output and a load adjustment threshold determined from an expected peak loading. A value for a load adjustment parameter is calculated by subtracting the renewable supply output and the load adjustment parameter from the current load. This value is then employed to control the variable load in an amount proportional to the value of the load control parameter when the parameter is within a predefined range. By so controlling the load, the effective capacity of the non-controllable, renewable power supply is increased without any attempt at operational feedback control of the renewable supply. The renewable supply may comprise, for example, a photovoltaic power supply or a wind-based power supply.

28 Claims, 3 Drawing Sheets

6,037,758

LOAD CONTROLLER AND METHOD TO ENHANCE EFFECTIVE CAPACITY OF A PHOTOVOLTAIC POWER SUPPLY

CROSS-REFERENCE TO RELATED APPLICATION

This application claims the benefit of United States provisional application Ser. No. 60/083,230, filed Apr. 27, 1998, which is hereby incorporated herein by reference in its entirety.

STATEMENT AS TO RIGHTS UNDER FEDERALLY SPONSORED RESEARCH

This invention was made with Government support under NREL Subcontract No. XAD-8-17671-01, Prime Contract No. DE-AC36-98GO10337 awarded by the Department of Energy. Accordingly, the U.S. Government has certain rights in this invention.

TECHNICAL FIELD

The present invention relates in general to a control apparatus and method for controlling a variable electric load which is supplied by a conventional power grid and a non-controllable, renewable power supply such as a photovoltaic power source, and more particularly, to a load controller and method which seek to maximize effective capacity of the renewable power source.

BACKGROUND OF THE INVENTION

The practical use of photovoltaic systems, which convert incident sunlight into electrical energy, continues to be of significant interest to the power generation industry. The development of more efficient solar cells, as well as the lower production costs realized by the manufacture of continuously deposited, amorphous solar cells, has made photovoltaic systems more realizable. Photovoltaic modules are being commercially used today to power devices such as radios, to trickle charge batteries in parked cars, and in night illumination systems.

Photovoltaic arrays may be used in a wide variety of additional settings. In general, photovoltaics may be used remotely with specific loads (e.g., signal repeating towers) or with unspecific loads (e.g., off-grid residences, off-grid villages), or connected to a power supply grid. Further, a photovoltaics supply may be connected to a power grid either on the customer-side or on the utility-side of an electric meter, depending upon who owns the system. The present invention is directed principally to applications concerning function-unspecific loads, primarily, but not uniquely in the context of grid-connected systems and on either side of the meter.

High efficiency power conditioning units (PCUs) are commercially available today to ensure that photovoltaic arrays operate near their maximum power point. These PCUs maximize energy transfer from sunlight to usable AC electricity. Under actual conditions, a 1 kW rated array is typically capable of producing anywhere between 1300 and 2500 kWh per year in the United States depending on local climate and array geometry. By contrast, an ideal generator working twenty-four hours per day would produce 8760 kWh per year per rated kW. The ratio between the photovoltaic array output and this ideal output is referred to as capacity factor. Hence, for a photovoltaic array, the capacity factor typically ranges from 15% to 28%. Electrical power plants derive value not only from energy production (their capacity factor) but also from their capacity, that is their contribution to a utility's spinning reserve, hence their ability to deliver power on demand.

Overall, the capacity value of an ideally dispatchable power plant is of the same order as the value of the energy delivered by that plant. Hence, the economics of photovoltaics have traditionally been penalized by the fact that no capacity value is considered for this resource. The present invention is thus directed to capturing additional value for photovoltaics (as well as other non-controllable, renewable resources) by increasing or even maximizing effective capacity of the non-controllable power supply when coupled to a power grid.

DISCLOSURE OF THE INVENTION

Briefly summarized, this invention comprises in one aspect a method for increasing effective capacity of a photovoltaic (PV) power supply coupled to a power grid and a variable load so that the variable load is powered by the power grid and the PV supply. The method includes: determining photovoltaic power supply output and current loading of the variable load; determining an expected peak loading of the variable load and ascertaining therefrom a load adjustment threshold; determining a value for a load adjustment parameter from the photovoltaic power supply output, the current loading, and the load adjustment threshold, the load adjustment parameter being defined as the current loading less the photovoltaic power supply output less the load adjustment threshold; and controlling the variable load employing the value of the load adjustment parameter. This controlling of the variable loading is preferably proportional to the value of the load adjustment parameter when the value is within a predefined range. The load adjustment parameter is employed to control the variable load so as to increase the effective capacity of the photovoltaic power supply without any operational feedback control of the PV supply.

In another aspect, a load controller is provided implementing the above-described method. This load controller controls a variable load coupled to a power grid and to a photovoltaic power supply. The load controller includes means for: (i) determining photovoltaic power supply output and current loading of the variable load; (ii) determining an expected peak loading of the variable load and ascertaining therefrom a peak adjustment threshold; (iii) determining a value for a load adjustment parameter based on the photovoltaic power supply output, the current loading, and the load adjustment threshold, the load adjustment parameter being defined as the current loading less the PV supply output less the load adjustment threshold; and (iv) controlling the variable load employing the value of the load adjustment parameter. This controlling of the variable load is such as to increase the effective capacity of the photovoltaic power supply.

In a further aspect, a load controller/method is provided for increasing effective capacity of any non-controllable, renewable power supply which is coupled to a power grid and to a variable load. The variable load is powered by the power grid and the non-controllable, renewable power supply. The technique includes: determining power output of the non-controllable supply and loading of the variable load; determining an expected peak loading of the variable load and ascertaining therefrom a load adjustment threshold; determining a value for a load adjustment parameter from the power output of the non-controllable supply, the current loading and the load adjustment threshold, the load adjustment parameter being defined as the current loading less the power output less the load adjustment threshold; and controlling the variable load employing the value of the load adjustment parameter to increase the effective capacity of the non-controllable, renewable power supply without operational feedback control of the power supply.

To restate, the load controller/method of the present invention enhances the economic feasibility of photovoltaic power plants by increasing their "effective capacity" through minimal, selective control of the load. Depending upon the geographical location, a load controller in accordance with this invention can add up to $50–$100 per kilowatt per year to the value of a demand-side photovoltaic power plant. The load controller/method presented enhances the grid penetration potential of a photovoltaic plant and enhances the acceptability of photovoltaics to utility companies. In effect, the present invention proposes selectively reshaping utility load patterns to provide a better match with photovoltaic power output, thereby increasing the ultimate share and reliability of photovoltaics in a utility power generation mix. This invention thus enhances deployment opportunities for the more environmentally benign photovoltaic industry. Additionally, the load controller/method presented herein could be applied with other environmentally benign, non-controllable but renewable resources, such as wind power generation.

Brief Description of the Drawings

The above-described objects, advantages and features of the present invention, as well as others, will be more readily understood from the following detailed description of certain preferred embodiments of the invention, when considered in conjunction with the accompanying drawings in which.

Figure 1:
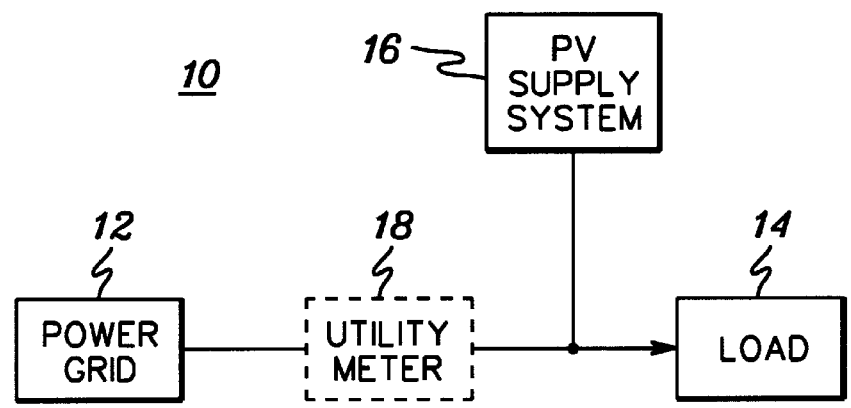
FIG. 1 is a simplified block diagram of a variable electric load supplied by a power grid and a non-controllable, renewable resource such as a photovoltaic (PV) supply system.

Best Mode for Carrying Out the Invention

Generally stated, "capacity" is a measure of power (kW) that can be "counted on" to meet load requirements. Even though photovoltaic arrays are capable of delivering a reasonable amount of energy, they are traditionally assigned no capacity. This is because photovoltaic output is dependent upon the weather and the cycle of days, and hence cannot be controlled or dispatched to meet load requirements. However, as explained herein, applicant has discovered that the "effective capacity" of a photovoltaic array can be quite high depending on the considered load.

The "effective capacity" of a power plant is the kilowatt (kW) amount by which the power plant may be expected to contribute to the total kilowatt generating capacity available to an electricity provider to meet load requirements. The considered load requirements may be regional (utility), localized (sub-utility) or end-use. In the latter case, when the considered power plant is located on the user-side of the meter, an alternate definition of effective capacity would be: the kilowatt amount by which the power plant may be expected to reduce the user's kilowatt demand. Effective capacity can also be used in relative (percent) terms as the ratio between the kilowatt effective capacity and the rated kilowatt capacity of the power plant.

Both energy and capacity are valuable commodities. On the customer side of an electric meter, large electrical users typically have to pay for both as energy and demand. On the utility side of the meter, capacity is valued against the cost of building new power plants. In addition, when considering dispersed generation such as photovoltaic arrays, locally available capacity is valued against the cost of maintaining and upgrading transmission and distribution power lines, transformers, etc.

One initial challenge facing applicant is to identify quantitative measures of effective capacity that best capture the ability of a non-controllable resource to meet loads. Several benchmarks have been developed and adapted for this purpose. First, an Effective Load Carrying Capability (ELCC) parameter is defined as a primary benchmark. This parameter is a probabilistic measure of available capacity that has traditionally been used by electric utilities to quantify the contribution of new power plants to the total capacity available to that utility under given loss of load probability conditions. The ELCC is a relative measure that can be reported in percent of rated capacity. For instance, a photovoltaic power plant with a rated capacity of 1000 kW and ELCC of 60% could be considered as the equivalent of a 600 kW ideally dispatchable unit.

Note that the geographic regions of highest ELCC do not necessarily overlap with regions of high solar energy resource. For instance, the mid-Atlantic seaboard features some of the highest ELCCs (e.g., 70%) in the United States. This region has not been noted for its high solar resource, however, while Florida with a much higher solar resource only achieves 40–50% ELCC.

Since the ELCC is a probabilistic measure, another benchmark is also needed. This benchmark, referred to as the Minimum Buffer Energy Storage (MBES), is defined as the minimum storage that would give a measure of the ability of a photovoltaic to meet its load requirements under worst case conditions. Essentially, the MBES is the amount of energy reserve that would be necessary in addition to the photovoltaic power plant to ensure that the photovoltaic power plant plus storage system could meet all loads above a given threshold, and hence deliver an effective capacity (ELCC) of 100%.

Through experimentation, applicant has discovered that for PV load penetration levels on the order of 5%, the amount of MBES could be as little as a fraction of a system hour. For instance, for New York's Con Edison at 5% PV load penetration (i.e., 500 MW installed photovoltaics) one-half hour worth of storage (250 MWh) would be enough to register a 100% ELCC (i.e., meeting all loads above 95% of maximum demand). By contrast, the amount of energy reserve to achieve the same capacity without photovoltaics would be five system hours (2500 MWh).

The example above applies to utility-wide (i.e., regional) load requirements. At the regional level, applicant has discovered that effective capacity is well correlated with specific load-shape characteristics (including the time of peak load and the summer-to-winter peak load ratio).

Localized loads have also been investigated, including substations and medium/large end-users. Applicant has discovered that the effective capacity of photovoltaic arrays, as quantified by the ELCC and MBES benchmarks, could be significant at this level as well. The relationship between load characteristics and photovoltaic effective capacity has been found to remain the same for these smaller localized loads. Among end-user types, the effective capacity is believed highest for air-conditioned office buildings and hospitals. The fact that localized and customer-side effective capacity can be controlled and remain significant has important economic implications. This means that, in addition to having utility-wide generating capacity value, a photovoltaic array could also capture a transmission and distribution value (on the utility side), and/or demand reduction value (on the customer side).

More specifically, the MBES benchmark indicates that if a photovoltaic array were operated under favorable conditions (for example, in a commercial office building or metropolitan substation/utility load) it would take only a small amount of energy reserve in addition to a photovoltaic power plant to increase effective capacity of the photovoltaic array to 100%. With demand rates as high as $30 kw for several large metropolitan utilities, this effective capacity increase is significant.

Rather than supplying stored or backup energy to compliment a photovoltaic array when needed to guarantee a high ELCC, the same effect is achieved in accordance with the principles of the present invention by controlling the load energy by an amount equal to the amount that would otherwise be needed to guarantee a desired effective capacity. Based on the MBES values reported above, the necessary load reductions would not have to be very large. Thus, a load controller in accordance with the present invention may act, for example, on the setting of a building energy system and/or end-use appliance by slightly modifying the system or appliance operating thresholds and/or operating schedules when needed to maintain effective capacity. It is important to note that the present invention does not seek to maximize the energy transfer from the photovoltaic to the grid. Power conditioning units (PCUs) are already available to perform this function as described above. Further, it is important to note that the present invention employs only an informational link between the photovoltaic array output and the load controller to be implemented.

In accordance with this invention, a load controller and method are proposed which seek to indefinitely control a variable load in a manner that has not heretofore been addressed. A load controller in accordance with this invention is designed to maximize a photovoltaic array's "effective capacity" by selective load control. Prior approaches either maximize energy transfer (for example, reference U.S. Pat. No. 5,560,218) or maximize power tracking (for example, reference U.S. Pat. No. 5,293,447), i.e., the ability of a photovoltaic battery to operate at its optimum point on an I-V curve. In the context of a load controller of the present invention, it is assumed that commercially available power conditioning units already maximize energy transfer from the photovoltaic plant to the AC power grid. The load controller presented herein is only concerned with the "effective capacity" of the photovoltaic array.

Further, load control with a photovoltaic plant is typically directly linked to a specific load (e.g., an air-conditioner). Conventional load control action involves feedback to the photovoltaic power plant's operation because the action taken on the load optimizes energy transfer from the power plant. This is to be contrasted with a load controller as presented herein. Pursuant to this invention, the PV power plant operates totally independently of the load controller. The link to the load controller is informational only. In fact, the photovoltaic plant and the load controller would not need to be co-located. For example, a utility operating a photovoltaic power plant could employ a load controller as presented herein to meet the load requirements of a summer peaking substation. Load control units (e.g., smart thermostats) installed at major customers served by the substation could be used to maximize the photovoltaic plant's effective capacity, and hence its support to the substation and the downstream distribution line, without any feedback on the operation of the photovoltaic power plant.

FIG. 1 depicts one embodiment of an electrical system 10 wherein a power grid 12 supplies power to a variable load 14 and a photovoltaic (PV) supply system 16 supplements power grid 12. A utility meter 18 (shown in phantom) is typically disposed between power grid 12 and the variable load 14. When disposed as shown in FIG. 1, the PV supply system 16 is connected on the customer-side of the meter. Alternatively, system 16 could be located on the utility-side of the meter depending upon who owns the photovoltaic system.

Figure 2:
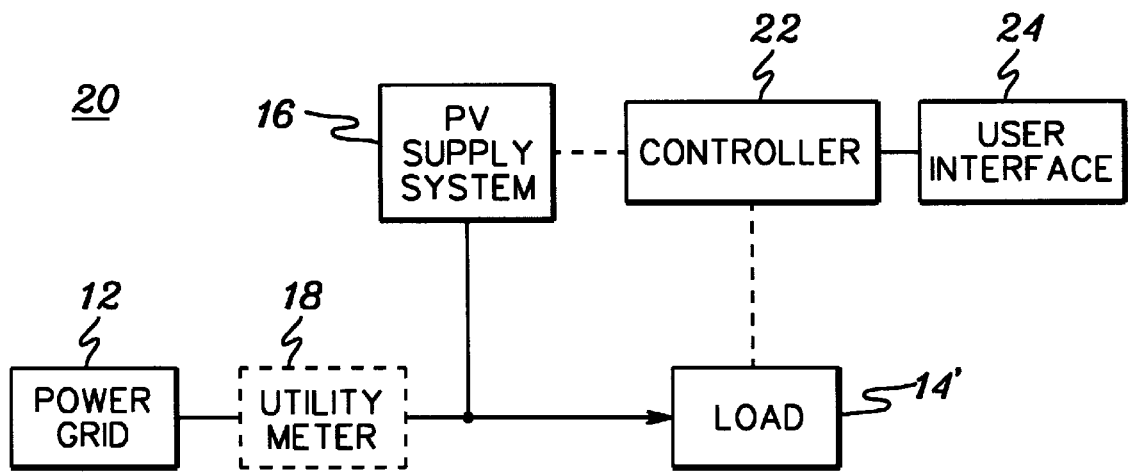
FIG. 2 is a block diagram of a load controller in accordance with the present invention shown with the system of FIG. 1.

FIG. 2 depicts one embodiment of a system 20 in accordance with the present invention wherein a load controller 22 is coupled to PV supply system 16 and variable load 14' for monitoring system 16 and load 14', and for controlling variable load 14' in order to increase or maximize "effective capacity" of the PV supply system 16. As noted, this is achieved without any feedback control of the PV supply system itself. If desired, a user interface 24 can be coupled to load controller 22 for facilitating user modification of one or more parameters (discussed below) employed in the control algorithm implemented by load controller 22.

Figure 3:
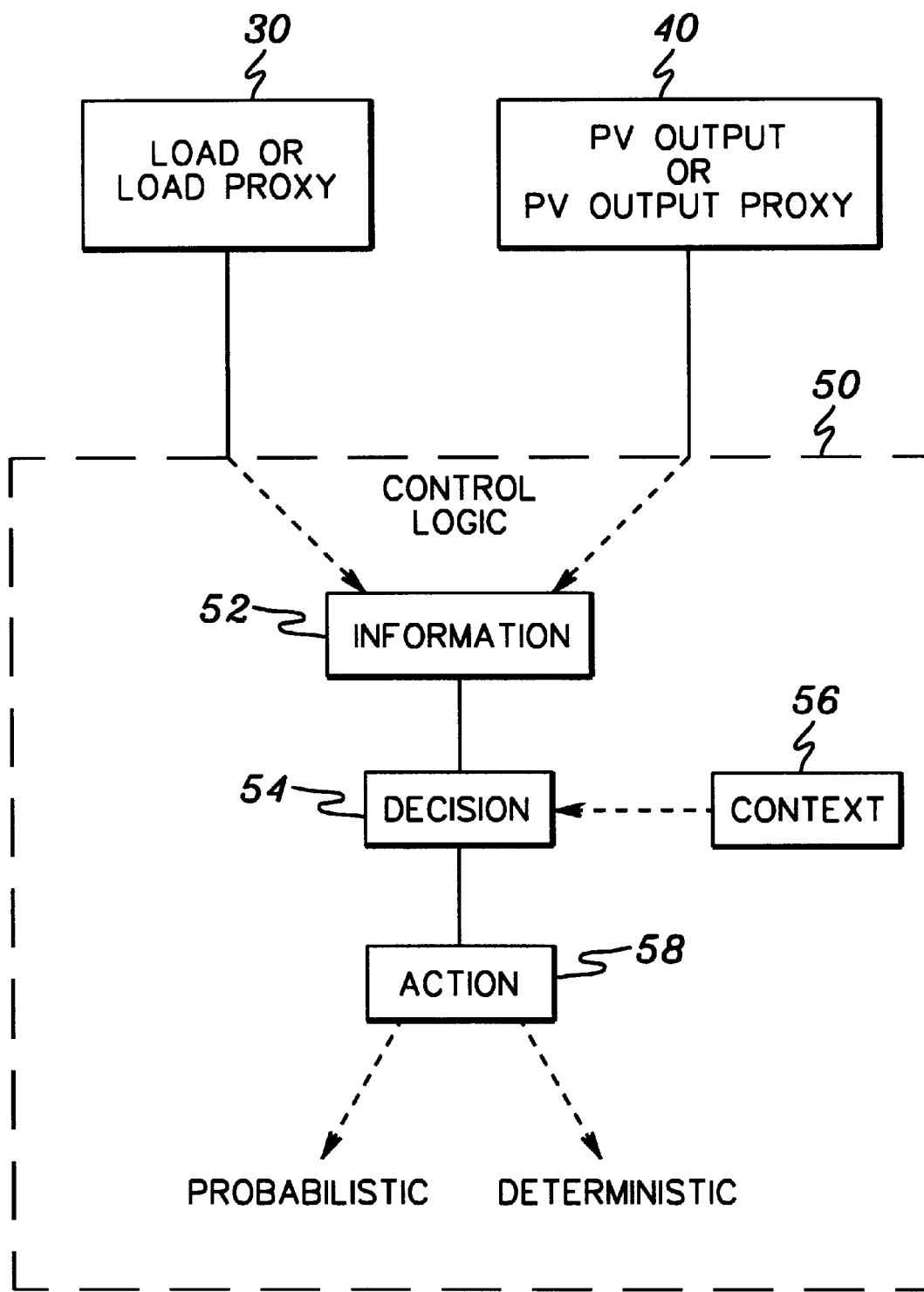
FIG. 3 is a flowchart of one embodiment of processing to be implemented by the load controller of FIG. 2.

A high level diagram of one embodiment of the control logic implemented by controller 22 is depicted in FIG. 3. The logical nodes of control logic 50 are information 52, decision 54 and action 58. Information 52 gathers/comprises the input required to operate the controller's logic. This input consists of, for example, real-time output of the photovoltaic power plant 40 and the real-time electrical load 30. Alternatively, the information may consist of proxies for the photovoltaic array output and the current load. For example, photovoltaic output proxies may include solar radiation information, cloud cover images sensed by weather satellites, etc., while load information proxies may comprise ambient temperature (which may be highly correlated with air-conditioning loads), time-of-day, time-of-week, and/or day-of-year information, etc. Note also that in a utility-side context, the relevant photovoltaic output may consist of the combined output of several disbursed photovoltaic plants affecting the considered load.

Figure 4:
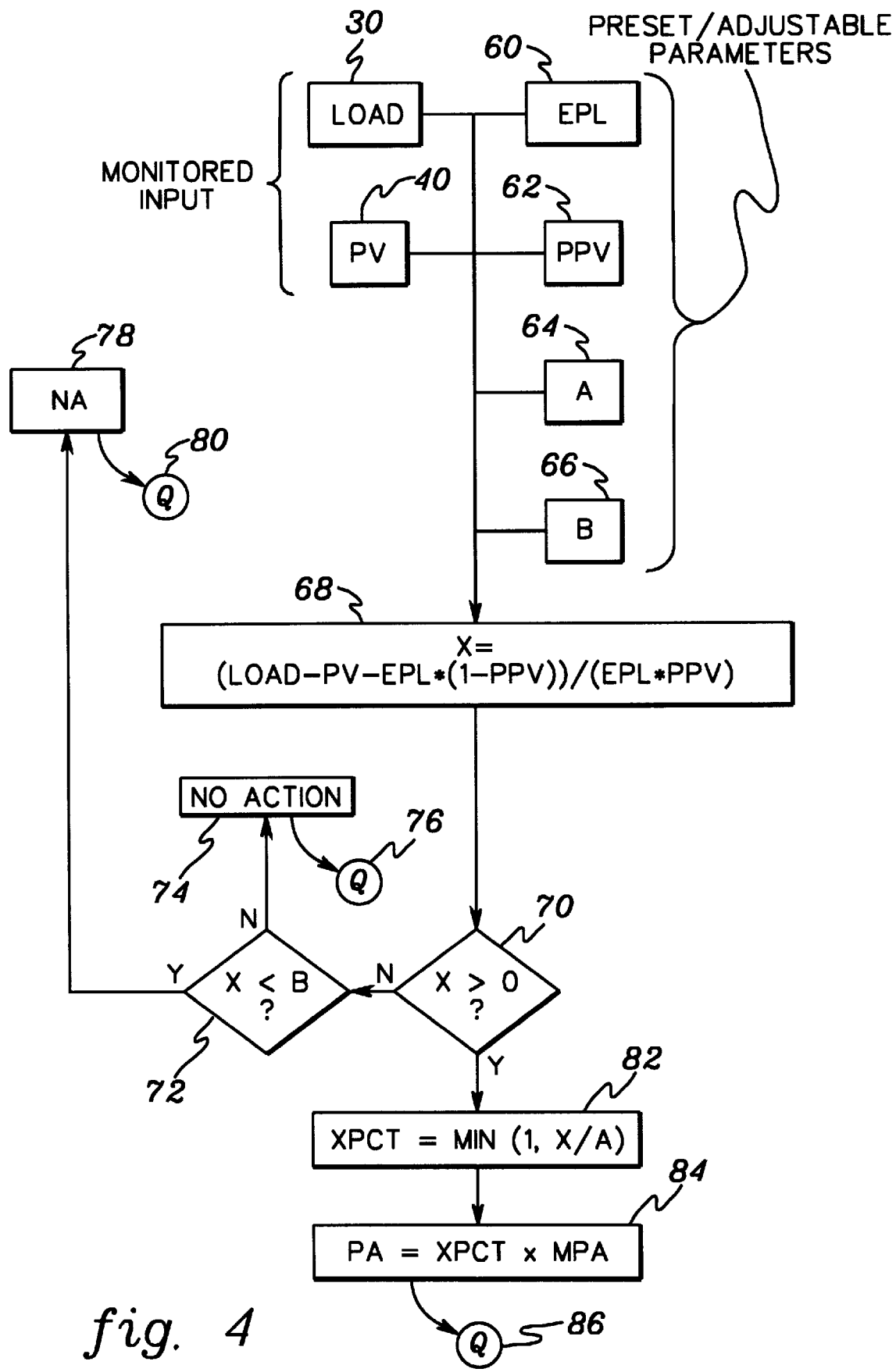
FIG. 4 is a more detailed embodiment of the control logic processing of FIG. 3 in accordance with the principles of the present invention.

The photovoltaic and load information is fed to the controller logic, for example, through dedicated signal wiring, wireless signal transmission, or power wires. The decision 54, which is described below with reference to FIG. 4, is made with reference to a contextual setting 56. The context indicates whether the load controller is used in a demand-side or a utility-side mode. In a demand-side context, the load controller is operated to maximize photovoltaic effective capacity with respect to the customer's electrical load, while in a utility-side context, the load controller is operated to maximize photovoltaic effective capacity with respect to loads upstream from the customer, for example, a local feeder, local substation load, or a utility-wide load.

Depending on the context and type of load controller application, decision center 54 could be co-located with the action center 58 or not. For instance, in a utility-side context, the decision could be made by a central utility-operated logical unit, sending signals to localized action devices. The load controller can operate with either a deterministic or a probabilistic approach. In a deterministic approach, the action might be an adjustment of a selected operating threshold. Positive action is the action of adjusting the operating threshold, preferably up to a maximum user-selected amount (maximum positive action (MPA)) in the sense of load reduction (e.g., raising operating temperature of an air-conditioned building). As explained further below, negative action may also be employed which could consist of a slight threshold adjustment tending to increase the load, or no action might be taken on the load depending upon the results of the decision logic.

In a probabilistic approach, take "negative action" (NA) might signify no pause or delay in the operation/startup of a given load component, such as an appliance or system. Maximum positive action (MPA) signifies enforcing a maximum delay/pause length on all considered appliances or components of the load. Further, in accordance with this invention, positive action (PA) is preferably prorated to the value of a load control parameter between zero and A. This would imply enforcing partial delay on all considered load components and/or more likely, enforcing a preset delay on a prorated fraction of the considered appliances or load components. Additionally, those skilled in the art will note that a probabilistic action may also comprise a threshold adjustment as described above in connection with a deterministic action.

The choice/effectiveness of the control strategy depends on the context of the load controller application. For a user-owned demand-side photovoltaic system, a deterministic strategy might be preferable (unless the user is very large with many diversified loads) because the effective capacity of the photovoltaic array, valued against the user's demand, could have a direct impact on the local load. Both strategies would be effective in the context of a utility-owned or operated system because the impact on effective capacity would not need to be highly localized.

FIG. 4 depicts one example of decision logic in accordance with the present invention. The decision per se is a decision whether to take action and if so, the type and magnitude of the action. The decision is implemented automatically and is preferably repetitively re-evaluated at a predefined interval of time (e.g., every 2–5 minutes). This embodiment of the decision logic employs six input parameters or variables. First, the real-time loading (or an approximation thereof) 30 as well as the real-time photovoltaic array output (or an approximation thereof) 40 are obtained. Note that the current load used as input is the load unaffected by the controller (i.e., if measured, the load should be adjusted to reflect the action taken by the controller). In addition, the decision logic receives certain predefined, user-adjustable values. These values include the expected peak loading (EPL) 60 and the percentage of photovoltaic penetration (PPV) 62, as well as two constants, A 64 and B 66.

The EPL is assumed valid for a defined period of time, and can be based on historical data, forecasts or even dynamically calculated. The PPV is a ratio of the size of the photovoltaic generator (or ensemble of considered generators) to the considered peak load. It is important to note that the PPV could be a fraction or a multiple of the size of the PV generator which is significant with respect to a probabilistic load controller operation. Constant A is a multiplier to the size of the photovoltaic generator, adjusting the load control threshold for maximum action, while constant B is a multiplier to the size of the photovoltaic generator and is used to decide between no action and negative action (described below).

Assuming that the above-described inputs are available, decision logic in accordance with the present invention determines a load adjustment parameter X as follows:

$$X = (\text{LOAD} - PV - EPL \cdot (1 - PPV))/(EPL - PPV)$$

where:
LOAD=current load (known or determined from proxy)
PV=current PV output (known or determined from proxy) corresponding to the considered context
EPL=expected peak load (depending on context, this may be a seasonal or daily forecast, or an estimated yearly or seasonal value based on historical end-use bills)
PPV=percentage of PV penetration determined by the ratio of the installed PV capacity and the peak of the considered load (depending on the load control strategy and context, parameter PPV could also be an arbitrary portion of the PV generator.)

Note that in effect the quantity EPL·(1−PPV) constitutes a decision threshold against which to gauge current load and PV output conditions. Upon calculating the load adjustment parameter X 68, the decision logic inquires whether the value of parameter X is greater than 0 70. If parameter X is negative, meaning that the loading is less than the photovoltaic output plus the load adjustment threshold as defined above, then (optionally) processing determines whether the load adjustment parameter X is less than a predefined constant B, which itself comprises a negative number 72. If parameter X is not less than constant B then no action 74 is taken and the decision logic returns Q 76 by an appropriate link to the action center (for example, a thermostat). However, if parameter X is less than the predefined constant B, processing is (optionally) directed to take "negative action" (NA) 78. If the action is deterministic, a negative action might be a preset adjustment of the considered operating threshold in the sense of a load increase (for example, lowering operating temperature of an air-conditioned building). If action is probabilistic, then negative action might signify no pause or delay in the operation/startup of the considered load component. After deciding to take negative action, processing proceeds to the action center via an appropriate link Q 80.

Returning to inquiry 70, if the load adjustment parameter X is a positive number, then the decision logic next determines a value for variable XPCT 82. XPCT is a factor between zero and one which essentially prorates the positive action to be taken relative to a maximum possible action (MPA), i.e., XPCT is defined as min(1, X/A). After determining XPCT, processing determines a positive action (PA) to be taken 84. In this example, positive action (PA) is a load controller determined fraction of the maximum positive action up to the maximum positive action. Thus, the load action taken in accordance with this invention will be prorated in many instances relative to the maximum positive action predefined for the load controller. Once the positive action (PA) is determined, processing is passed to the action center Q 86 for implementation of a deterministic or probabilistic action as described above.

By way of example, one of ordinary skill in the art will understand that the present invention can be implemented employing a "smart thermostat". The smart thermostat is a conventional thermostat that would have the capability of receiving logic-driven signals and adjusting user-set temperature upwards or downwards, depending on the logic's decisions. The example presented below assumes a demand-side photovoltaic system.

In one example, the LOAD and PV output could either be measured or estimated from proxies (e.g., outdoor temperature, time of day and/or a photometer installed on the end-user's premises). A logic unit, installed in a central location (e.g., near an HVAC center, or near the PV power conditioning unit) would interpret this information, determine the value of X, and send a series of pre-determined signals to the room thermostat. These signals would correspond to amounts by which to increase or reduce user-selected temperatures. Action orders would be sent to the thermostats via thermostatic wire or any other appropriate means. In the case of decentralized HVAC units (e.g., room HVAC units used in many hotels), action orders could be sent through power wire to the HVAC units, and appropriately relayed through thermostatic wires. The EPL parameter used in this example could simply be a conservative fraction of the expected building peak load based on simulation or historical demand bills. The PPV parameter would be the ratio of installed PV capacity to the expected building peak load or a fraction/multiple thereof.

Those skilled in the art will note from the above description, that a load controller/method in accordance with the present invention enhances the economic feasibility of non-controllable power plants by controllably increasing their "effective capacity" through selective control of the load. Depending upon the geographical location, a load controller in accordance with this invention can add up to $50–$100 per kilowatt per year to the value of a demand-side photovoltaic power plant. The load controller/method enhances the grid penetration potential of a photovoltaic plant and enhances the acceptability of photovoltaics to utility companies. In effect, the present invention proposes selectively and dynamically reshaping utility load patterns over an indefinite period of time to provide a better match with photovoltaic power output, thereby increasing the ultimate share and reliability of photovoltaics in a utility power generation mix. The present invention thus enhances deployment opportunities for the more environmentally benign photovoltaic industry. Additionally, the load controller/method presented herein could be applied with other environmentally benign, non-controllable but renewable resources, such as wind power generation.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

I claim:

1. A method for increasing effective capacity of a photovoltaic power supply coupled to a power grid and a variable load, said variable load being powered by said power grid and said photovoltaic power supply, said method comprising:
    (a) determining photovoltaic power supply output and current loading of said variable load;
    (b) determining an expected peak loading of said variable load and ascertaining therefrom a load adjustment threshold;
    (c) determining a value for a load adjustment parameter from said photovoltaic power supply output, said current loading and said load adjustment threshold, said load adjustment parameter being defined as said current loading less said photovoltaic power supply output less said load adjustment threshold; and
    (d) controlling said variable load employing said value of said load adjustment parameter to increase the effective capacity of said photovoltaic power supply without operational feedback control of said photovoltaic power supply.

2. The method of claim 1, wherein said controlling (d) comprises acting on said variable load in a manner proportional to said value of said load adjustment parameter when said value is within a predefined range.

3. The method of claim 1, wherein said controlling (d) comprises adjusting current loading of said variable load if said value of said load adjustment parameter exceeds zero, said adjusting being proportional to said value.

4. The method of claim 3, wherein said controlling (d) comprises adjusting an operating threshold of at least one load component of said variable load.

5. The method of claim 4, further comprising predefining a maximum possible action (MPA) and wherein said adjusting of said operational threshold comprises adjusting said operational threshold proportional to said value up to said MPA.

6. The method of claim 3, wherein said controlling (d) comprises delaying operation of at least one load component of said variable load, said operational delay being proportional to said value of said load adjustment parameter.

7. The method of claim 1, wherein said load adjustment threshold is defined as:

$$(EPL \cdot (1-PPV))/(EPL \cdot PPV)$$

wherein:
    EPL=expected peak loading of said variable load; and
    PPV=rated size of said photovoltaic power supply divided by EPL or a fraction or multiple thereof.

8. The method of claim 1, wherein said determining (a) comprises directly monitoring in real time at least one of said photovoltaic power supply output and said current loading of said variable load.

9. The method of claim 1, wherein said determining (a) comprises indirectly monitoring at least one of said photovoltaic power supply output and said current loading of said variable load, said indirect monitoring of said photovoltaic power supply output comprising employing at least one of solar radiation information or satellite weather imaging, and said indirect monitoring of said current loading comprising employing at least one of ambient temperature, time-of-day information, or day-of-year information.

10. The method of claim 1, wherein said load adjustment threshold of said determining (b) comprises a fraction of said expected peak loading.

11. The method of claim 10, wherein said determining (b) comprises pre-determining said expected peak loading of said variable load for a defined interval of time.

12. The method of claim 1, further comprising automatically periodically performing said (a)–(d).

13. The method of claim 1, wherein said controlling (d) comprises taking negative action when said value of said load adjustment parameter is negative and below a pre-defined negative action threshold B, said negative action resulting in an increase of said current loading.

14. The method of claim 13, wherein said controlling (d) comprises taking positive action to adjust said current loading of said variable load whenever said value of said load adjustment parameter exceeds zero, said positive action being proportional to said value and comprising one of a deterministic action or a probabilistic action.

15. A load controller for controlling a variable load coupled to a power grid and a photovoltaic power supply, said load controller comprising:

(i) means for determining photovoltaic power supply output and current loading of the variable load;

(ii) means for determining an expected peak loading of said variable load and for ascertaining therefrom a load adjustment threshold;

(iii) means for determining a value for a load adjustment parameter based on said photovoltaic power supply output, said current loading, and said load adjustment threshold, said load adjustment parameter being defined as said current loading less said photovoltaic power supply output less said load adjustment threshold; and (iv) means for controlling said variable load employing said value of said load adjustment parameter to increase the effective capacity of said photovoltaic power supply.

16. The load controller of claim 15, wherein said (i)–(iv) means each comprise automatic means, and wherein said load controller further comprises means for periodically performing said automatic means (i)–(iv).

17. The load controller of claim 15, wherein said load adjustment threshold is defined as:

$$(EPL \cdot (1-PPV))/(EPL \cdot PPV)$$

wherein:

EPL=expected peak loading of said variable load; and

PPV=rated size of said photovoltaic power supply divided by EPL or a fraction or multiple thereof.

18. The load controller of claim 15, wherein said means for controlling comprises means for adjusting said current loading of said variable load if said value of said load adjustment parameter exceeds zero, said adjusting being proportional to said value.

19. The load controller of claim 15, wherein said means for controlling comprises means for adjusting said current loading of said variable load in a manner proportional to said value of said load adjustment parameter when said value is within a predefined range.

20. The load controller of claim 19, wherein said means for controlling comprises means for adjusting an operating threshold of at least one load component of said variable load.

21. The load controller of claim 15, wherein said means for controlling comprises means for taking one of positive action or negative action depending upon whether said load adjustment parameter is positive or negative, respectively.

22. The load controller of claim 15, wherein said means for controlling comprises means for delaying operation of at least one load component of said variable load, said operational delay being proportional to said value of said load adjustment parameter.

23. The load controller of claim 15, wherein said means (i) comprises means for directly monitoring in real time at least one of said photovoltaic power supply output and said current loading of said variable load.

24. The load controller of claim 15, wherein said means (i) comprises means for indirectly monitoring at least one of said photovoltaic power supply output and said current loading of said variable load, said means for indirect monitoring of said photovoltaic power supply output comprising means for employing at least one of solar radiation information or satellite weather imaging, and said means for indirect monitoring of said current loading comprising means for employing at least one of ambient temperature, time-of-day information, or day-of-year information.

25. A method for increasing effective capacity of a non-controllable, renewable power supply coupled to a power grid and a variable load, said variable load being powered by the power grid and the non-controllable, renewable power supply, said method comprising:

(a) determining power output of said non-controllable supply and current loading of said variable load;

(b) determining an expected peak loading of said variable load and ascertaining therefrom a load adjustment threshold;

(c) determining a value for a load adjustment parameter from said power output of said non-controllable supply, said current loading and said load adjustment threshold, said load adjustment parameter being defined as said current loading less said power output less said load adjustment threshold; and (d) controlling said variable load employing said value of said load adjustment parameter to increase the effective capacity of said non-controllable, renewable power supply without operational feedback control of said renewable power supply.

26. The method of claim 25, wherein said non-controllable, renewable power supply comprises one of a photovoltaic power supply or a wind-based power supply.

27. A load controller for controlling a variable load coupled to a power grid and a non-controllable, renewable power supply, said load controller comprising:

(i) means for determining power output of said non-controllable supply and current loading of said variable load;

(ii) means for determining an expected peak loading of said variable load and for ascertaining therefrom a load adjustment threshold;

(iii) means for determining a value for a load adjustment parameter from said power output of said non-controllable supply, said current loading and said load adjustment threshold, said load adjustment parameter being defined as said current loading less said power output less said load adjustment threshold; and (iv) means for controlling said variable load employing said value of said load adjustment parameter to increase the effective capacity of said non-controllable, renewable power supply.

28. The load controller of claim 27, wherein said non-controllable, renewable power supply comprises one of a photovoltaic power supply or a wind-based power supply.

* * * * *